United States Patent [19]

Brooks et al.

[11] 3,741,051

[45] June 26, 1973

[54] STACK FEEDING METHOD AND APPARATUS

[75] Inventors: Dean P. Brooks, Hesston; Ferol S. Fell; Harold Keith Garrison, both of Newton, all of Kans.; Richard W. Job, Racine, Wis.

[73] Assignee: Hesston Corporation, Hesston, Kans.

[22] Filed: May 26, 1971

[21] Appl. No.: 146,882

[52] U.S. Cl. .......................... 83/23, 83/109, 83/401
[51] Int. Cl. ......................... A01f 29/00, B26d 7/06
[58] Field of Search .................... 146/70, 70.1, 155; 83/23, 109, 401

[56] References Cited
UNITED STATES PATENTS 2,541,442  2/1951  Skoog ............................. 146/155 X
3,385,336  5/1968  Barnard .......................... 146/155 X
3,477,488  11/1969  Burrows .............................. 146/70

Primary Examiner—Willie G. Abercrombie
Attorney—Schmidt, Johnson, Hovey & Willaims

[57] ABSTRACT

Livestock feed such as hay is fed from a stack by loading the stack on a bed and transporting it to a feeding point. The stack is then advanced intermittently along the bed to a position partially underlying a raised cutter bar slicer. As the slicer is lowered, the slices are pushed away from the stack and caused to gravitate to a lateral conveyor which transfers the hay thus sliced from the stack to a point of discharge.

29 Claims, 10 Drawing Figures

Patented June 26, 1973

INVENTORS.
Dean P. Brooks
Ferol S. Fell
Harold Keith Garrison
Richard W. Job
BY
Schmidt, Johnson, Hovey & Williams
ATTORNEYS.

Patented June 26, 1973
3,741,051
4 Sheets-Sheet 2
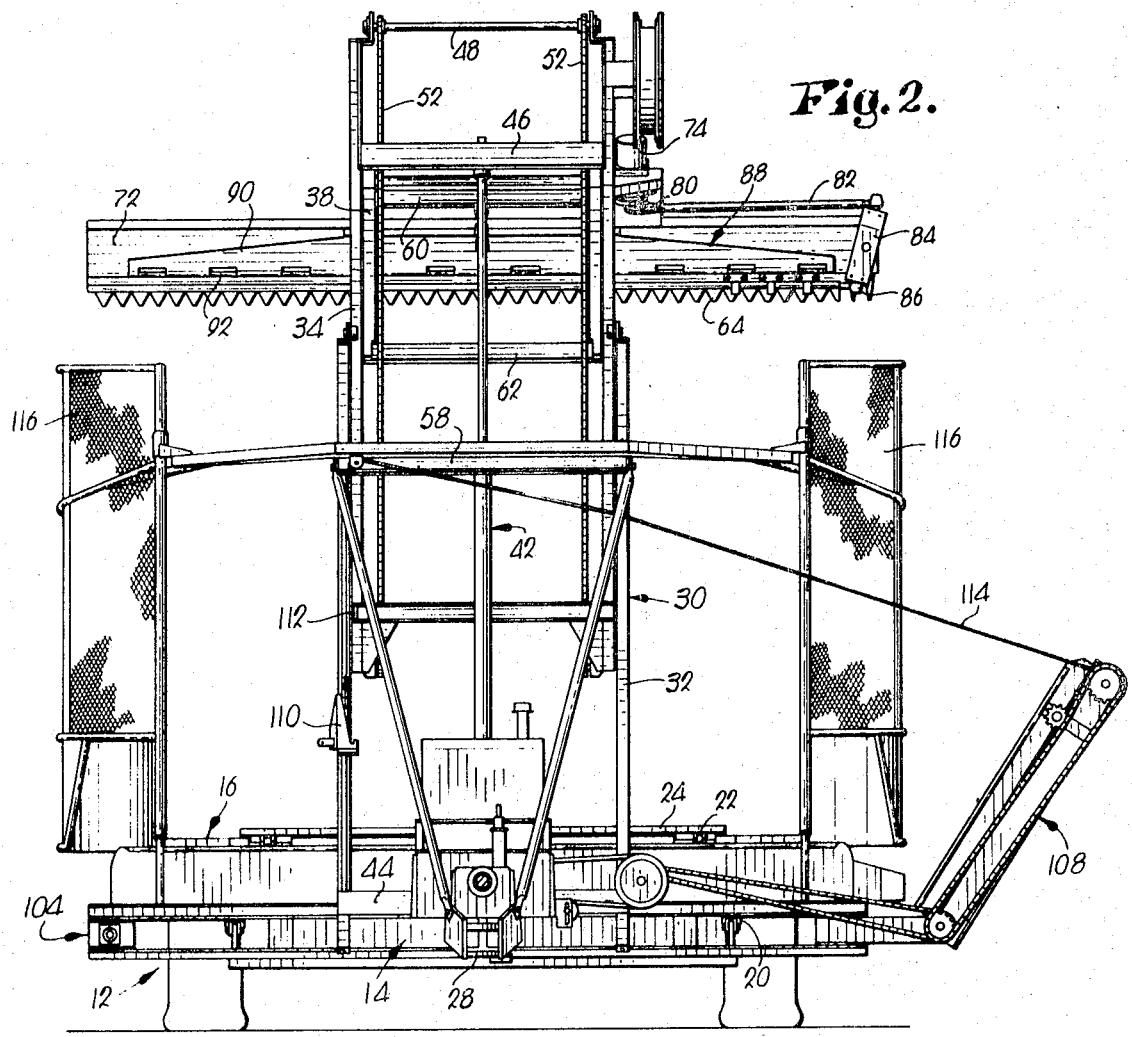
Fig. 2.
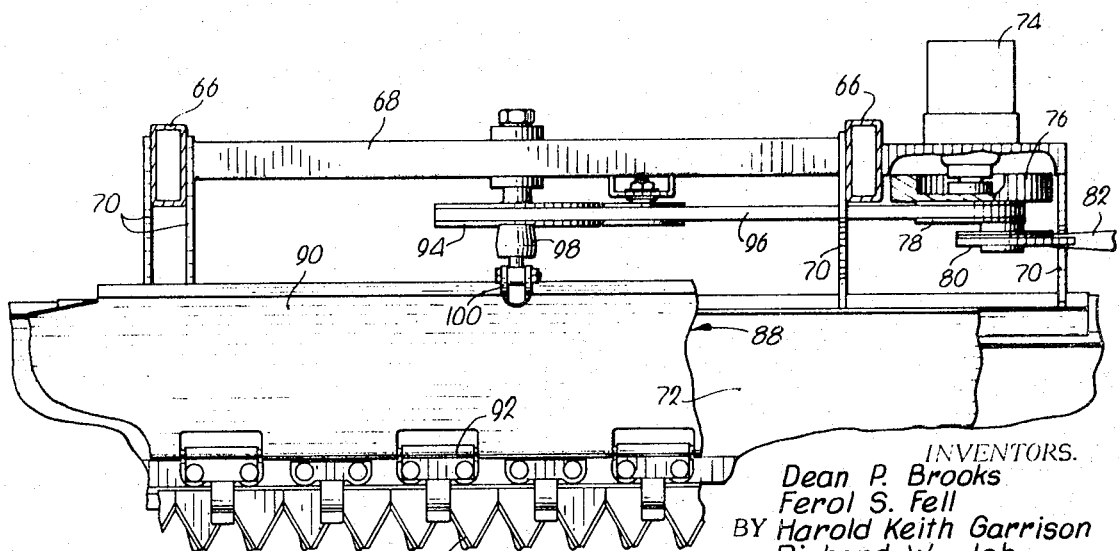
Fig. 5.
INVENTORS.
Dean P. Brooks
Ferol S. Fell
BY Harold Keith Garrison
Richard W. Job
ATTORNEYS.

Patented June 26, 1973

INVENTORS.
Dean P. Brooks
Ferol S. Fell
BY Harold Keith Garrison
Richard W. Job

ATTORNEYS.

Patented June 26, 1973

INVENTORS.
Dean P. Brooks
Ferol S. Fell
BY Harold Keith Garrison
Richard W. Job

Schmidt, Johnson, Hovey & Williams
ATTORNEYS.

STACK FEEDING METHOD AND APPARATUS

An important object of our present invention is to provide an improved method and implement for feeding from stacks by cutting the stacks into separate slices and discharging the slices into shredders or grinders, into feed bunks or directly onto the ground in the case of range feeding of livestock.

Another important object of the instant invention is to provide for raising the stack, transporting it to a feeding point and thereupon removing portions of the stack in the form of slices while the implement is advanced along the feed bunks or across a feeding area of an open range.

Still another important object of the present invention is to provide for automatic operation in which, by a single, continuous step, the entire stack is sliced and fed without interruption, manual labor or consumption of an appreciable amount of time.

In the drawings:

FIG. 2 is a front elevational view thereof;

FIG. 5 is a fragmentary cross-sectional view taken on line 5—5 of FIG. 4, parts being broken away and in section for clearness;

Figure 1:
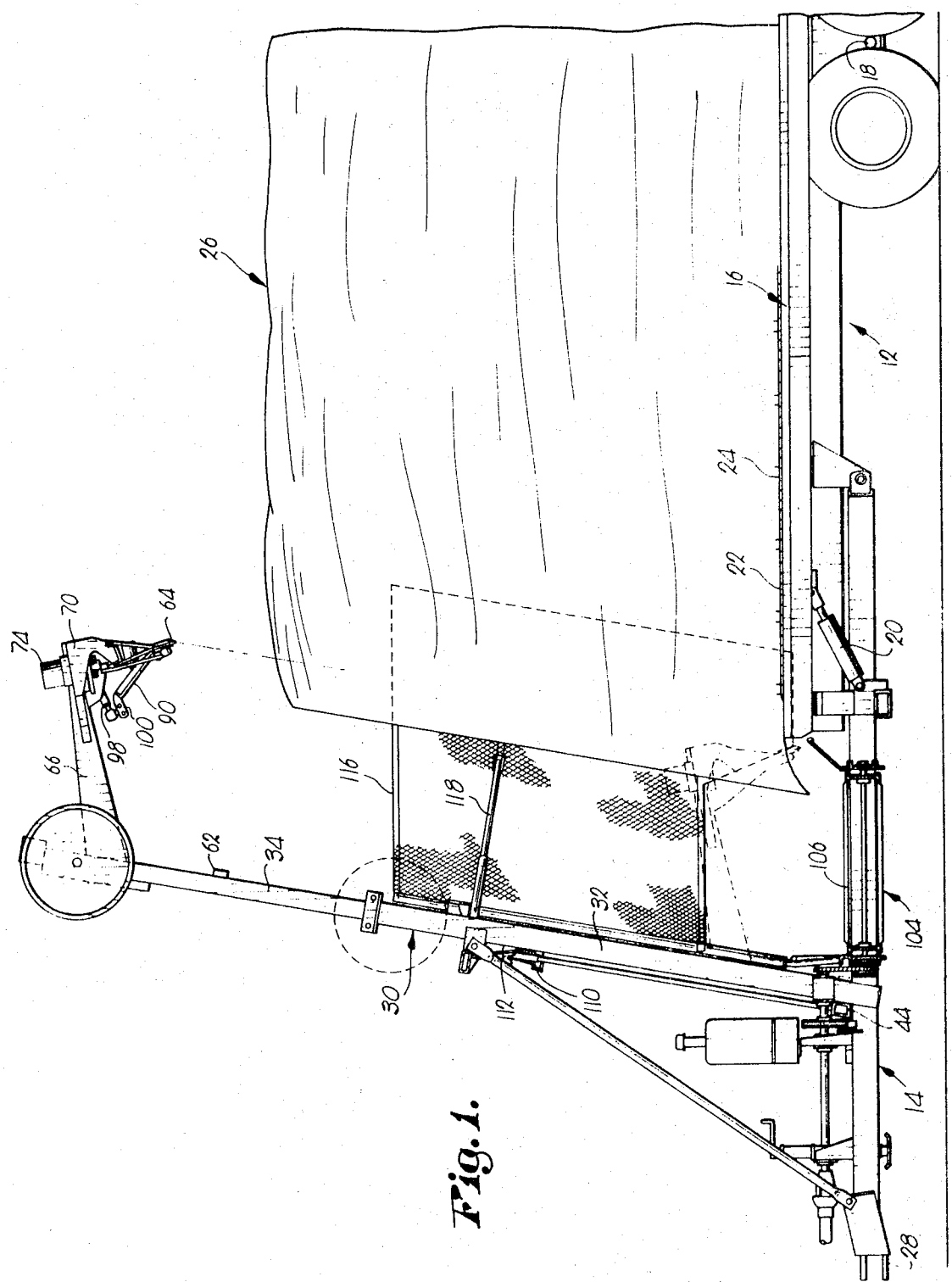
FIG. 1 is a fragmentary side elevational view of a stack feeding apparatus made in accordance with our present invention and capable of carrying out our improved method of feeding from stacks.
Figure 3:
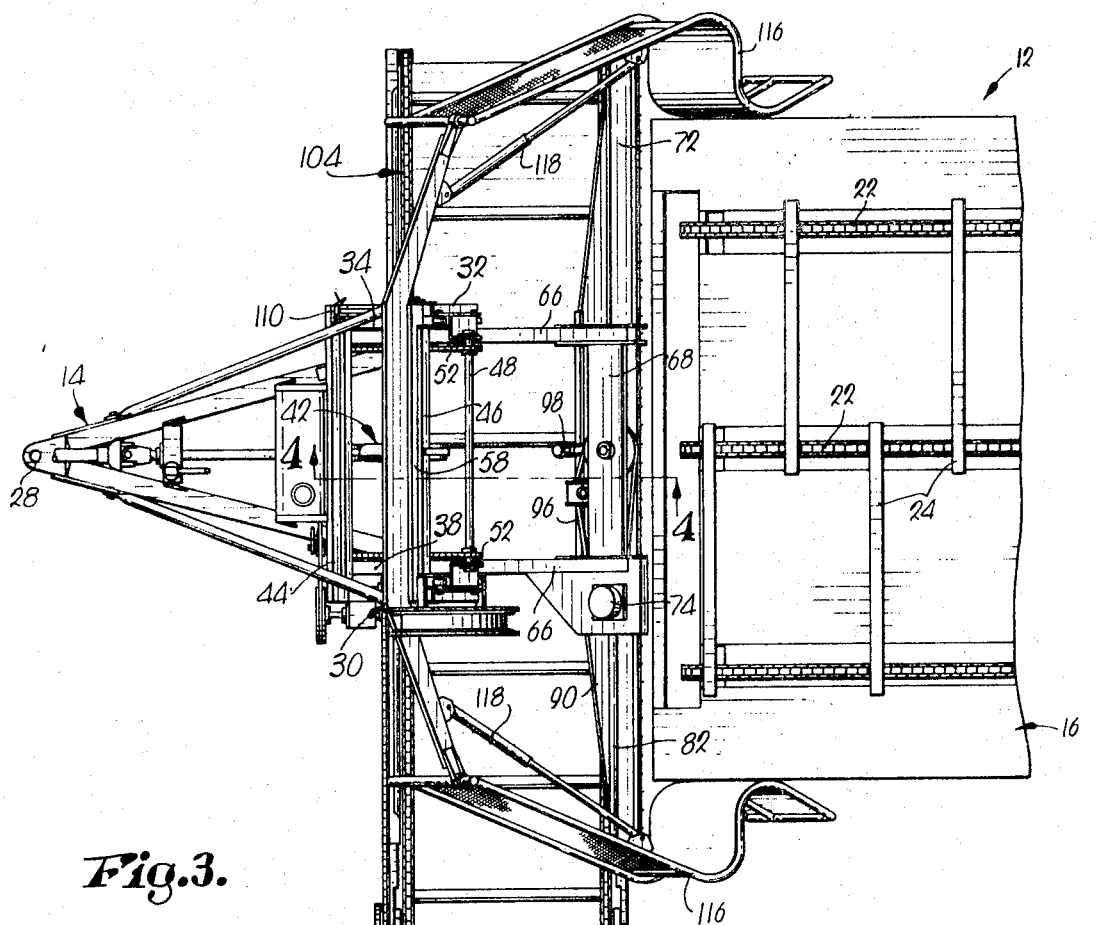
FIG. 3 is a fragmentary top plan view thereof.
Figure 9:
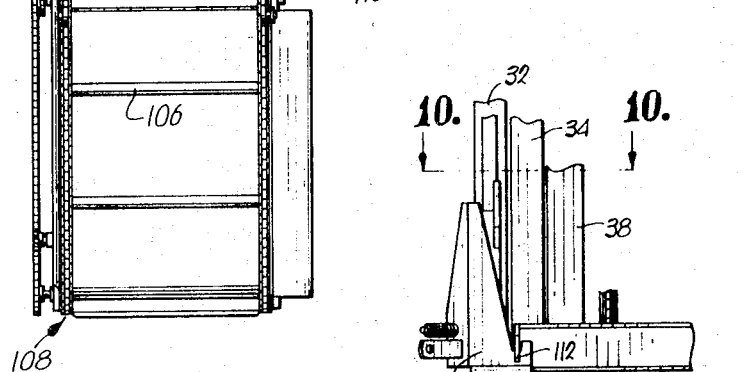
FIG. 9 is an enlarged, fragmentary front elevational view similar to FIG. 2 illustrating certain of the components of the mast at its lower end.
Figure 10:
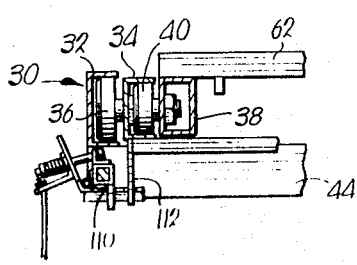
FIG. 10 is a cross-sectional view taken on line 10—10 of FIG. 9.
Figure 7:
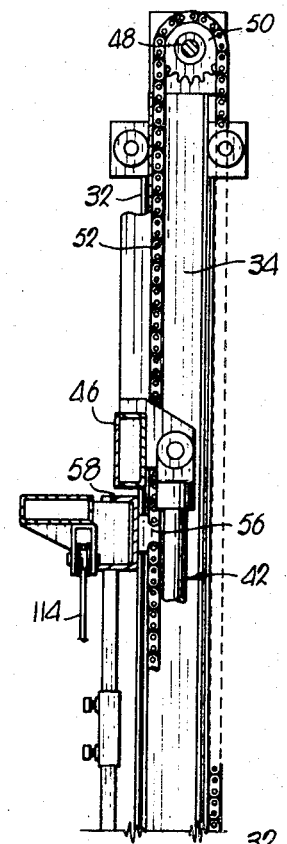
FIG. 7 is an enlarged, fragmentary detailed front elevational view similar to FIG. 2 illustrating certain of the upper components of the mast.
Figure 7:
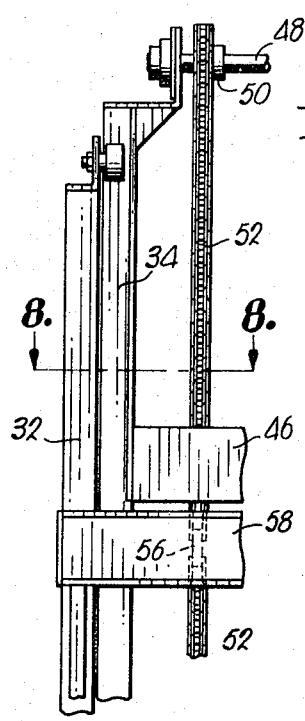
Figure 8:
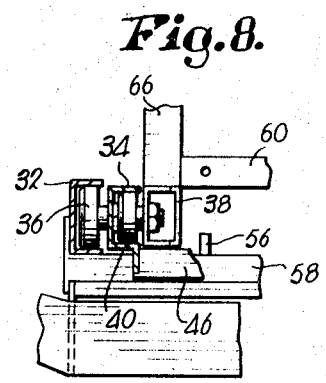
FIG. 8 is a fragmentary, detailed cross-sectional view taken on line 8—8 of FIG. 7.

It is contemplated by the instant invention that hay may be fed to animals by picking up the stack, hauling it to the feed lot, advancing the stack forwardly along the bed of the transporting vehicle, cutting the stack into slices, conveying the slices laterally, and discharging them directly into the feed bunks. Variations in the procedure include ways other than that hereinafter explained for loading the hay onto the wagon, use of trucks or other self-propelled vehicles rather than trailers, feeding into shredders or grinders, unloading onto the ground or into receptacles other than bunks, and many other modifications of the method and the specific details of construction, all within the scope of our invention.

Accordingly, a wheeled trailer 12 is provided with a tongue 14, a stack-supporting bed 16 tiltable rearwardly about a horizontal axis 18, fluid pressure piston and cylinder means 20 for tilting bed 16, and drag chain means 22 with cross slats 24 for loading stack 26 onto bed 16 when it is tilted, comparable in broad concepts to U. S. Pat. No. 3,209,932 issued to Bruce A. Schiltz on Oct. 5, 1965.

Tongue 14, which may be considered to be all of the framework from axis 18 to hitch 28, supports a mast 30 disposed in spaced relation to the front end of bed 16 and inclined rearwardly toward the stack 26 as the upper end of mast 30 is approached. Mast 30 is provided with a differential purchase arrangement by the use of a base section 32, an intermediate section 34 having rollers 36 which engage base section 32, and by an upper section 38 having rollers 40 which engage intermediate section 34, such that extension of a fluid pressure piston and cylinder unit 42 to raise intermediate section 34, multiplies the amount of upward movement of upper section 38.

Each of the three polygonal sections 32, 34 and 38 of mast 30 is provided with a pair of spaced, U-shaped side rails or channels interconnected by a pair of crosspieces, the lower crosspiece 44 of base section 32 pivotally receiving the lower end of unit 42 and the upper crosspiece 46 of intermediate section 34 pivotally receiving the upper end of unit 42, such that extension of unit 42 raises both sections 34 and 38.

The upper end of intermediate section 34 has a cross shaft 48 provided with a pair of sprocket wheels 50, each receiving a chain 52, and the lower end of intermediate section 34 has sprocket wheels 54 beneath which the chains 52 are trained. The forward stretches of chains 52 are attached to brackets 56 on the upper crosspiece 58 of base section 32, whereas the rear stretches of chains 52 are attached to upper and lower crosspieces 60 and 62 respectively of upper section 38. Thus, as intermediate section 34 is raised by unit 42, the sprocket wheels 50 and 54 rotate anticlockwise, viewing FIG. 4, to also raise the upper section 38.

The above-mentioned reciprocable structure, which includes the section 38, carries mechanism for cutting slices off the stack 26 on each downstroke of upper section 38, such mechanism including a sickle 64 reciprocable transversely of the path of reciprocation of sections 34 and 38 of mast 30. Upper section 38 has two arms 66 rigid thereto and extending from its side rails and its upper crosspiece 60 toward the stack 26 above the space between mast 30 and bed 16. Arms 66 are joined at their outer ends by a crosshead 68 and are provided with brackets 70 which support a beam 72 therebelow. Beam 72 provides the support at its lower longitudinal edge for the sickle 64.

Sickle 64 is driven from a hydraulic motor 74 which rotates a flywheel 76, a pulley 78 and an eccentric 80 on pulley 78. A pitman rod 82 coupled with eccentric 80 has a pivotal connection with a link 84 swingable on beam 72 and joined to sickle 64 by a universal joint 86.

By virtue of the inclination of mast 30, there is a reduction in the tendency of hay falling from the stack 26 into the path of upward movement of the mechanism which includes arms 66, crosshead 68, beam 72 and sickle 64. However, as the sickle 64 cuts kerfs through the stack 26 in front of bed 16 on the downstrokes of such mechanism, the slices thus severed tend to lean against the stack 26. Separating means in the nature of a vibratory apparatus 88 is therefore provided on beam 72 for reciprocation therewith.

Apparatus 88 is in the nature of an elongated panel-like flipper 90 having a hinge connection 92 with beam 72 adjacent sickle 64. Flipper 90 is coextensive in length with the beam 72 and the sickle 64 and is appreciably widened intermediate its ends. It is oscillated about hinge 92 by the motor 74 through a pulley 94 carried by crosshead 68 and coupled with pulley 78 by a belt 96. A link 98 pivotally interconnects a bracket 100 on flipper 90 and an eccentric 102 on pulley 94.

Flipper 90 descends with beam 72, enters the kerf made by sickle 64 to widen the kerf and separates the slice away from the stack 26 in the direction of advancement of stack 26 toward mast 30. Such displacement of the slice to overcome its tendency to lean away from the mast 30 is enhanced by the slice pushing movement of flipper 90 downwardly and away from the beam 72 as shown by dotted lines in FIG. 4.

A lateral conveyor 104 (driven from the power take-off shaft of the tractor, not shown, for towing the trailer 12) is provided on the framework which includes tongue 14 to receive the gravitating slices as the sickle 64 descends to the dotted line position shown in FIG. 1, and to transfer the slices from beneath the descending mechanism. Conveyor 104 is provided with a continuous drag chain assembly 106 which extends entirely across the front of bed 16 and around a swingable section 108 of conveyor 104.

When it is desired to raise conveyor section 108 to the position shown in FIG. 2, a spring-loaded latch 110, reciprocable on mast section 32, is swung into the path of a hook 112 on mast section 34. As latch 110 is lowered by the hook 112 it pulls on a cable 114 to raise the conveyor section 108.

Mast 30 also supports a pair of wings 116 swingable toward and away from each other to constrain the slices for gravitation to the conveyor 104. Extensible, spring-loaded linkage 118 permits the wings 116 to adjust in accordance with the width of the stack 26.

OPERATION

Through use of a tractor or other towing vehicle coupled with the hitch 28, the trailer 12 is backed into the stack while the bed 16 is tilted about the axis 18 through use of the piston-cylinder means 20. Simultaneous operation of the drag chain means 22 transfers the stack 26 onto the bed 16, whereupon the latter is returned to its normal horizontal position illustrated in FIG. 1.

The vehicle 12 is then moved, with the stack 26 thereon, to a feeding point, and the drag chain means 22 is again placed in operation to advance the stack 26 slightly toward the mast 30 to the position shown in FIG. 1 where a portion of the stack 26 extends beyond the front of the bed 16 in underlying relationship to the sickle 64, such extended portion of the stack 26 also partially overlapping the lateral conveyor 104.

The piston and cylinder unit 42 is then retracted to lower the sickle 64 into cutting relationship to the stack 26. Manifestly, the stack 26 remains stationary during the downstroke of the sickle 64, and the flipper 90 as well as the sickle 64 are driven continuously by the motor 74 during the retraction of the power means 42. Moreover, the conveyor 104 is driven continuously to transfer the hay which it receives laterally of the trailer 12 beyond the section 108 of the conveyor 104.

Throughout the slicing operation the flipper 90 pushes the hay downwardly and away from the stack 26 toward the mast 30 for gravitation to the conveyor 104, and the wings 116 operate to guide the cutaway hay so as to properly land upon the continuously moving assembly 106.

The sickle 64 is then again raised to the position shown in full lines by FIG. 1; the stack 26 is advanced another increment; and the sickle 64 is lowered to slice off another quantity of feed from the stack 26.

In one contemplated use, the vehicle 12 is advanced continuously along the feed bunks so as to deposit the hay thereinto from the conveyor section 108. On the other hand, in the case of range feeding, the vehicle 12 may be advanced continuously to deposit the hay on the ground in a suitable feeding area. Still further, the hay emanating from the conveyor section 108 may be discharged directly into equipment for further processing such as shredders or grinders.

Figure 4:
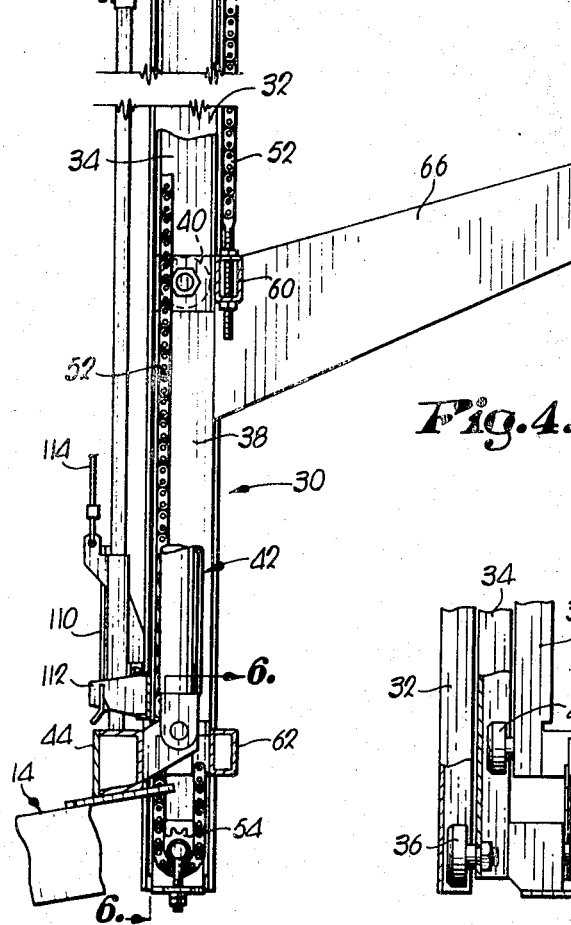
FIG. 4 is an enlarged, fragmentary cross-sectional view taken on line 4—4 of FIG. 4 but with the cutter head shown in its lowered position.
Figure 6:
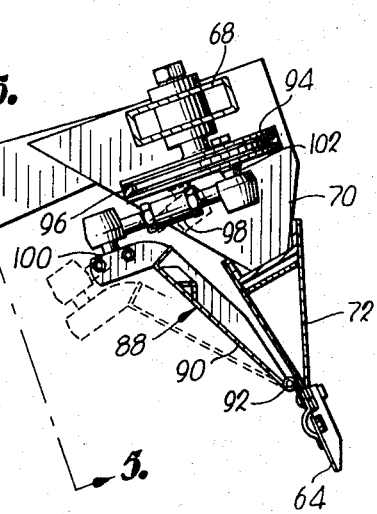
FIG. 6 is a fragmentary, detailed cross-sectional view taken on line 6—6 of FIG. 4.

For over-the-road travel, the mast sections 34 and 38, and therefore the cutter head are lowered to the position illustrated in FIG. 4, and during such lowering, the latch 110 is swung to a position within the path of travel of the hook 112 so as to raise the conveyor section 108 through the cable 114 to the position illustrated in FIG. 2.

Having thus described the invention, what is claimed as new and desired to be secured by Letters Patent is:

1. A feeder for a stack of harvested crop comprising:
an elongated stack support;
a mast spaced from one end of said support to define a crop-receiving space between the mast and said end; structure carried by the mast for reciprocation along the mast between the upper and lower ends of the mast;
means engageable with the stack on said support for intermittently advancing the stack along the support to position a portion of the stack beyond said end of the support in overhanging relationship to said space; and
cutting mechanism carried by said structure for reciprocation therewith and extending across the stack transversely to the direction of advancement thereof for progressively slicing said overhanging portion off said stack and progressively into said space transversely of said direction of advancement of the stack during each downstroke of said structure until all of said portion has been separated from the stack.

2. A stack feeder as claimed in claim 1; and means for transferring said slices from beneath said mechanism as the slices gravitate through said space.

3. A stack feeder as claimed in claim 2; and means constraining said slices for gravitation to said transfer means.

4. A stack feeder as claimed in claim 1; and means guiding said structure for reciprocation along a rectilinear path inclined toward said stack as said upper end of the mast is approached.

5. A stack feeder as claimed in claim 4, said mechanism including a sickle reciprocable horizontally and rectilinearly along a path of travel normal to the path of reciprocation of said structure.

6. A stack feeder as claimed in claim 4; and means for overcoming the tendency of the slices to lean away from the mast toward said stack.

7. A stack feeder as claimed in claim 1, said mechanism including a sickle reciprocable transversely of the path of reciprocation of said structure.

8. A stack feeder as claimed in claim 7; and means carried by said structure for reciprocation therewith, for movement into the kerfs made into the stack by said sickle as the kerfs are made, and for displacing the slices away from the stack in the direction of advancement of the stack.

9. A stack feeder as claimed in claim 8, said displacement means including apparatus extending along the sickle and swingably mounted for oscillation toward and away from the slices during said downstroke of said structure.

10. A stack feeder as claimed in claim 1; and means for separating said slices from the stack and moving the same away from the stack in the direction of advancement of the stack.

11. A stack feeder as claimed in claim 10; and means for receiving said separated slices and transferring the same from beneath said mechanism.

12. A stack feeder as claimed in claim 10, said separating means including apparatus for widening the kerfs made in the stack by said mechanism.

13. A stack feeder as claimed in claim 12; and means for vibrating said apparatus as said kerfs are made.

14. A stack feeder as claimed in claim 13; and means mounting said apparatus on said structure for reciprocation therewith.

15. A stack feeder as claimed in claim 2, said transferring means including a lateral conveyor.

16. A stack feeder as claimed in claim 16; and means guiding said structure for reciprocation along a rectilinear path inclined toward said stack as said upper end of the mast is approached.

17. A stack feeder as claimed in claim 17, and structure including a boom extending from the mast toward the stack in overlying relationship to said space, said mechanism Including a sickle carried by the boom remotely from the mast and reciprocable transversely of the path of reciprocation of said structure.

18. A stack feeder as claimed in claim 18; and means carried by said boom for reciprocation therewith, for movement into the kerfs made into the stack by said sickle as the kerfs are made, and for displacing the slices away from the stack in the direction of advancement of the stack.

19. A method of feeding from a stack of harvested crop which includes the steps of:
    loading the stack onto a support;
    advancing the stack along the support to a position overhanging an end of the support and underlying a cutter;
    lowering the cutter across the stack transversely to its direction of advancement to progressively slice the overhanging portion from said stack for gravitation from the support;
    removing the slice from beneath the cutter as the latter progressively descends from the support raising the cutter; and
    repeating the stack-advancing, slice-cutting and slice-removing steps successively until the stack is totally unloaded From the support.

20. A method of feeding from a stack as claimed in claim 19 wherein the support is transported to a previously formed stack prior to loading and then transported to a point of feeding prior to cutting off the first slice.

21. A method of feeding from a stack as claimed in claim 20 wherein the support Is advanced as the stack is unloaded.

22. A method of feeding from a stack as claimed in claim 19 wherein a portion of the stack extends beyond said support each time the stack is in said position, said portions comprising the slices that are cut off the stack by the cutter.

23. A method of feeding from a stack as claimed in claim 19 wherein the slices are constrained to gravitational movement as they are cut off, and are removed by conveying the same laterally of the support.

24. A method of feeding from a stack as claimed in claim 19 wherein the slices are pushed away from the stack as they are being cut off.

25. A method of feeding from a stack as claimed in claim 19 wherein the cuts through the stack are on an incline commencing at a point overlying the support and terminating at a point spaced outwardly of one end of the support.

26. A method of feeding from a stack as claimed in claim 25 wherein the slices are constantly flipped away from the stack as they are cut therefrom to overcome their tendency to lean toward the stack.

27. A stack feeder comprising:
    a stack support;
    means engageable with the stack on the support for advancing the stack along the support;
    cutting mechanism including a reciprocable sickle;
    means supporting said mechanism for movement along a path through said stack with the sickle reciprocating transversely of said path for cutting a slice off the stack; and
    separating means movable with said mechanism for insertion into the kerfs made in the stack by said sickle as the kerfs are made for displacing the slices away from the stack in the direction of advancement of the stack.

28. A stack feeder as claimed in claim 27, said separating means including apparatus extending along the sickle and swingably mounted for oscillation toward and away from the slices during said downstroke of said structure.

29. A stack feeder comprising:
    a stack support;
    means engageable with the stack on the support for advancing the stack along the support;
    cutting mechanism;
    means supporting said mechanism for movement relative to the support for cutting a slice off the stack during such movement;
    apparatus For widening the kerfs made in the stack by said mechanism to separate said slices away from the stack in the direction of advancement of the stack; and
    means for vibrating said apparatus as said kerfs are made.

* * * * *